Patented Sept. 20, 1932

1,878,040

UNITED STATES PATENT OFFICE

ARTHUR VOSS, OF FRANKFORT-ON-THE-MAIN-HOCHST, GERMANY, ASSIGNOR TO I. G. FARBENINDUSTRIE AKTIENGESELLSCHAFT, OF FRANKFORT-ON-THE-MAIN, GERMANY

WATER-SOLUBLE VISCOUS CONDENSATION PRODUCTS OF ALDEHYDES AND PROCESS OF PREPARING THEM

No Drawing. Application filed February 20, 1930, Serial No. 430,101, and in Germany March 2, 1929.

The present invention relates to water-soluble viscous condensation products and process of preparing them.

Various processes are known for the manufacture of condensation products by causing formaldehyde to act upon aldehydes in the presence of weak alkalies, particularly of alkaline earths. These condensation products constitute well defined chemical individuals, namely polyvalent alcohols. Thus, according to the statements of Tollens and his pupils (see Liebig's Annalen 265, page 316) formaldehyde and acetic aldehyde produce chiefly pentaerythrite besides small quantities of syrupy by-products. Furthermore it is known that resinous condensation products may be obtained by causing formaldehyde to act upon aldehydes.

I have found that valuable condensation products soluble in water can be made by after-treatment of the water-soluble condensation products obtained under mild conditions from formaldehyde on the one hand and from saturated aliphatic aldehydes, or mixtures of saturated aliphatic aldehydes on the other hand.

This after-treatment consists in further heating the crude condensation products, obtainable from the said components, in a vacuum at a moderately raised temperature below 100° C. until any non-condensed constituents are no longer contained in the mass or until these non-condensed constituents are reduced to a minimum and until the mass has assumed a homogeneous and syrupy nature. The final products obtained according to this process are more or less highly viscous, colorless and thoroughly transparent masses which even after the lapse of years, show no tendency to crystallize or to assume a resinous character. From the resinous products they differ particularly by their ready solubility in water with which they are miscible in any proportion. The components and their proportion to each other may vary within wide limits according to the purpose for which the products are intended. It is advisable to select as condensing agents for the preparation of the condensation products serving as starting material, those mentioned in the pertaining literature, namely the alkaline earths, such as baryta or milk of lime; also zinc-oxide or magnesia, borax, soda and the like. Instead of formaldehyde there may be used formaldehyde forming substances such as para-formaldehyde.

Owing to their physical and chemical properties the products obtained are of great technical value. They are well suited as a substitute for glycerine for many purposes. Furthermore they may be applied as finishing agents in the textile industry and as assistants in dyeing processes; also in other cases, for instance in printing, for impregnating paper or the like. As the products have not the strongly hygroscopic properties of glycerine, and moreover may be manufactured, according to the conditions applied, in very varied degrees of viscosity, that is to say, from thin syrup to a scarcely liquid mass, their field of application is for the greater part more extensive than that of glycerine.

The following examples illustrate the invention, but are not intended to limit it thereto, the parts being by weight:

1. 400 parts of formaldehyde of 30 per cent. strength are mixed with 100 parts of acetaldehyde. Into this mixture 5 parts of barium hydroxide are slowly introduced while well stirring. The temperature is kept at about 40° to 50° C. and care is taken that the temperature does not exceed 50° C., if necessary by external cooling. If after about 5 hours a test shows that only a small quantity of formaldehyde is still present, the barium is precipitated in the form of carbonate by introducing carbon dioxide and the carbonate is removed by filtration. The filtrate is evaporated in a vacuum at about 60° to 65° C. Together with the water which is eliminated by distillation small quantities of unaltered aldehyde likewise pass over. The filtrate is then allowed to cool whereby a limpid, highly viscous and colorless syrup is obtained which is very easily soluble in water but insoluble in organic solvents. It does not alter its properties, even after the lapse of years.

2. 400 parts of formaldehyde of 30 per cent.

strength are mixed with 50 parts of acetaldehyde and 15 parts of acetone. Into this mixture 12 parts of calcium hydroxide are introduced the temperature being kept during about 12 hours at 30° to 35° C. while stirring. By adding the calculated quantity of oxalic acid the calcium is precipitated as oxalate; the latter is filtered by suction and the filtrate is evaporated as described in Example 1. The product obtained is also a limpid, colorless syrup which is of still higher viscosity than that described in Example 1. In other respects its properties are similar to those of the product of that example.

3. 700 parts of formaldehyde are mixed with 50 parts of aldol and 70 parts of acetaldehyde. To this mixture barium hydroxide is added by small amounts at a temperature not exceeding 50° C., the addition being made in such a manner that the reaction is always kept feebly alkaline. As soon as the formaldehyde has almost completely disappeared, the solution is worked up in the manner described in the foregoing examples. A colorless to feebly yellow syrup is obtained, which is soluble in water and very well suited for application in the textile industry as a finishing agent.

4. 400 parts of a formaldehyde solution of 30 per cent. strength are mixed with 120 parts of propionic aldehyde. To this solution 250 parts of milk of lime, containing 30 parts of $Ca(OH)_2$, are added and the mixture is slowly heated on the water bath while well stirring. It is kept at about 80° C. until the formaldehyde has nearly disappeared. Then the lime is separated in the form of its carbonate or oxalate and the clear solution is evaporated in a vacuum to a syrupy consistency.

A clear and very viscous syrup is obtained, which readily dissolves in water and whose properties are similar to those of the product of Example 1.

5. 350 parts of formaldehyde are mixed with 30 parts of an aqueous sodium carbonate solution of 12 per cent. strength, and 120 parts of normal butyraldehyde are slowly added while maintaining room temperature. This room temperature is kept for several hours and the temperature is then raised to 70° to 80° C. and maintained at this degree until an odor of formaldehyde is no longer perceptible. If the alkaline reaction should have entirely disappeared while unchanged aldehyde is still present, the condensation process is completed by again adding some alkali. The clear solution is evaporated in a vacuum. A clear syrup is obtained having properties similar to those stated in Example 5.

6. 100 parts of para-formaldehyde are mixed with 200 parts of alcohol and 65 parts of glyoxal of 87 per cent. strength and 15 parts of concentrated caustic soda solution are added. 70 parts of cyclohexanone are then caused to run slowly into the solution at room temperature. After the total amount of the cyclohexanone has been run in, the solution is still kept for several hours at 70° to 75° C. and then, after it has been placed in a vacuum, the temperature is further maintained at 70° to 75° C. until all of the water has been distilled.

After cooling there is obtained a condensation product in the form of a viscous, feebly yellow syrup which is readily soluble in water and suitable as a finishing and smoothing agent.

I claim:

1. Process of preparing water-soluble viscous condensation products from the water-soluble condensation products prepared from formaldehyde and saturated aliphatic aldehydes which comprises subjecting the above mentioned condensation products to the influence of a reduced pressure at a temperature below 100° C.

2. Process of preparing water-soluble viscous condensation products from the water-soluble condensation products prepared from formaldehyde and saturated aliphatic aldehydes in the presence of an inorganic alkaline catalyst which comprises subjecting these condensation products to the influence of a reduced pressure at a temperature below 100° C.

3. Process of preparing water-soluble viscous condensation products from the water-soluble condensation products prepared from formaldehyde and saturated aliphatic aldehydes in the presence of an inorganic alkaline catalyst selected from the group consisting of alkaline earth oxides and hydroxides, magnesia, zinc oxide, borax and soda, which comprises subjecting these condensation products to the influence of a reduced pressure at a temperature below 100° C.

4. Process of preparing water-soluble viscous condensation products from the water-soluble condensation products prepared from formaldehyde and saturated aliphatic aldehydes in the presence of an inorganic alkaline catalyst which comprises subjecting these condensation products to the influence of a reduced pressure at a temperature of about 60° C.–70° C.

5. Process of preparing water-soluble viscous condensation products from the water-soluble condensation products prepared from formaldehyde and saturated aliphatic aldehydes in the presence of an inorganic alkaline catalyst selected from the group consisting of alkaline earth oxides and hydroxides, magnesia, zinc oxide, borax and soda, which comprises subjecting these condensation products to the influence of a reduced pressure at a temperature of about 60° C.–70° C.

6. Process of preparing water-soluble viscous condensation products from the water-soluble condensation products prepared from formaldehyde and acetaldehyde in the presence of an inorganic alkaline catalyst which comprises subjecting these condensation products to the influence of a reduced pressure at a temperature below 100° C.

7. Process of preparing water-soluble viscous condensation products from the water-soluble condensation products prepared from formaldehyde and glyoxal in the presence of an inorganic alkaline catalyst which comprises subjecting these condensation products to the influence of a reduced pressure at a temperature below 100° C.

8. Process of preparing water-soluble viscous condensation products from the water-soluble condensation products prepared from formaldehyde and acetaldehyde in the presence of an inorganic alkaline catalyst selected from the group consisting of alkaline earth oxides and hydroxides, magnesia, zinc oxide, borax and soda, which comprises subjecting these condensation products to the influence of a reduced pressure at a temperature below 100° C.

9. Process of preparing water-soluble viscous condensation products from the water-soluble condensation products prepared from formaldehyde and acetaldehyde in the presence of an inorganic alkaline catalyst selected from the group consisting of alkaline earth oxides and hydroxides, magnesia, zinc oxide, borax and soda, which comprises subjecting these condensation products to the influence of a reduced pressure at a temperature of about 60° C.–70° C.

10. As new products, water-soluble, limpid, viscous condensation products substantially identical with those obtainable by the action of a reduced pressure at a temperature below 100° C. upon the water-soluble condensation products having been prepared from formaldehyde and saturated aliphatic aldehydes.

11. As new products, water-soluble, limpid, viscous condensation products substantially identical with those obtainable by the action of a reduced pressure at a temperature below 100° C. upon the water-soluble condensation products having been prepared from formaldehyde and saturated aliphatic aldehydes by means of an inorganic alkaline catalyst.

12. As new products, water-soluble, limpid, viscous condensation products substantially identical with those obtainable by the action of a reduced pressure at a temperature of about 60° C. to 70° C. upon the water-soluble condensation products having been prepared from formaldehyde and saturated aliphatic aldehydes by means of an inorganic alkaline catalyst selected from the group consisting of alkaline earths, magnesia, zinc oxide, borax and soda.

13. As new products, water-soluble, limpid, viscous condensation products substantially identical with those obtainable by the action of a reduced pressure at a temperature of about 60° C. to 70° C. upon the water-soluble condensation products having been prepared from formaldehyde and acetaldehyde by means of an inorganic alkaline catalyst selected from the group consisting of alkaline earths, magnesia, zinc oxide, borax and soda.

14. As new products, water-soluble, limpid, viscous condensation products substantially identical with those obtainable by the action of a reduced pressure at a temperature of about 60° C. to 70° C. upon the water-soluble condensation products having been prepared from formaldehyde and glyoxal by means of an inorganic alkaline catalyst selected from the group consisting of alkaline earths, magnesia, zinc oxide, borax and soda.

In testimony whereof, I affix my signature.

ARTHUR VOSS.